United States Patent [19]

Muchow et al.

[11] 4,199,834
[45] Apr. 29, 1980

[54] PIG BALL TRANSFER UNIT

[75] Inventors: John D. Muchow, Long Beach; Graham J. Jones, Cypress; Maurice Slegers, Lakewood, all of Calif.

[73] Assignee: Willis Oil Tool Co., Long Beach, Calif.

[21] Appl. No.: 928,359

[22] Filed: Jul. 27, 1978

[51] Int. Cl.² ............................................. B08B 9/04
[52] U.S. Cl. ............................ 15/104.06 A; 137/553; 251/267
[58] Field of Search ............... 15/104.06 R, 104.06 A, 15/3.5, 3.51; 137/268, 553; 251/267

[56] References Cited

U.S. PATENT DOCUMENTS

| | | | |
|---|---|---|---|
| 2,977,616 | 4/1961 | Willis | 15/104.06 A |
| 3,063,079 | 11/1962 | Bergman et al. | 15/104.06 A |
| 3,063,080 | 11/1962 | Bergman et al. | 15/104.06 A |
| 3,169,263 | 2/1965 | Eagleton | 15/104.06 A |
| 3,246,666 | 4/1966 | Park et al. | 15/104.06 B |
| 3,266,077 | 8/1966 | Elliott et al. | 15/104.06 A |
| 3,720,228 | 3/1973 | Wheatley, Jr. | 15/104.06 A X |
| 3,779,270 | 12/1973 | Davis | 15/104.06 A |
| 3,809,113 | 5/1974 | Grove et al. | 15/104.06 A |
| 3,957,245 | 5/1976 | Daghe | 251/267 X |
| 4,133,288 | 1/1979 | Burgess | 137/553 X |

FOREIGN PATENT DOCUMENTS 222450  7/1962 Austria ................................. 251/267

*Primary Examiner*—Edward L. Roberts
*Attorney, Agent, or Firm*—Paul A. Weilein

[57] ABSTRACT

Similar transfer units are disclosed for launching pig balls into a pipeline and for receiving the pig balls from a downstream portion of the pipeline, each of the transfer units including a hollow housing providing an axially aligned manually or hydraulically operable valve member and valve seat for closing off a magazine which is inclined from horizontal to permit gravity transfer of the pig balls, the hollow housing being otherwise shaped to facilitate transfer of the pig balls. With a pair of the transfer units being connected with a pipeline, the launching unit includes controlled plungers for regulating passage of individual pig balls into the pipeline while the receiving unit at the downstream portion of the pipeline is arranged for directing the pig balls into the receiving unit. A magazine housing for each unit is separable from the hollow housing to facilitate replacement of the valve seat.

10 Claims, 9 Drawing Figures

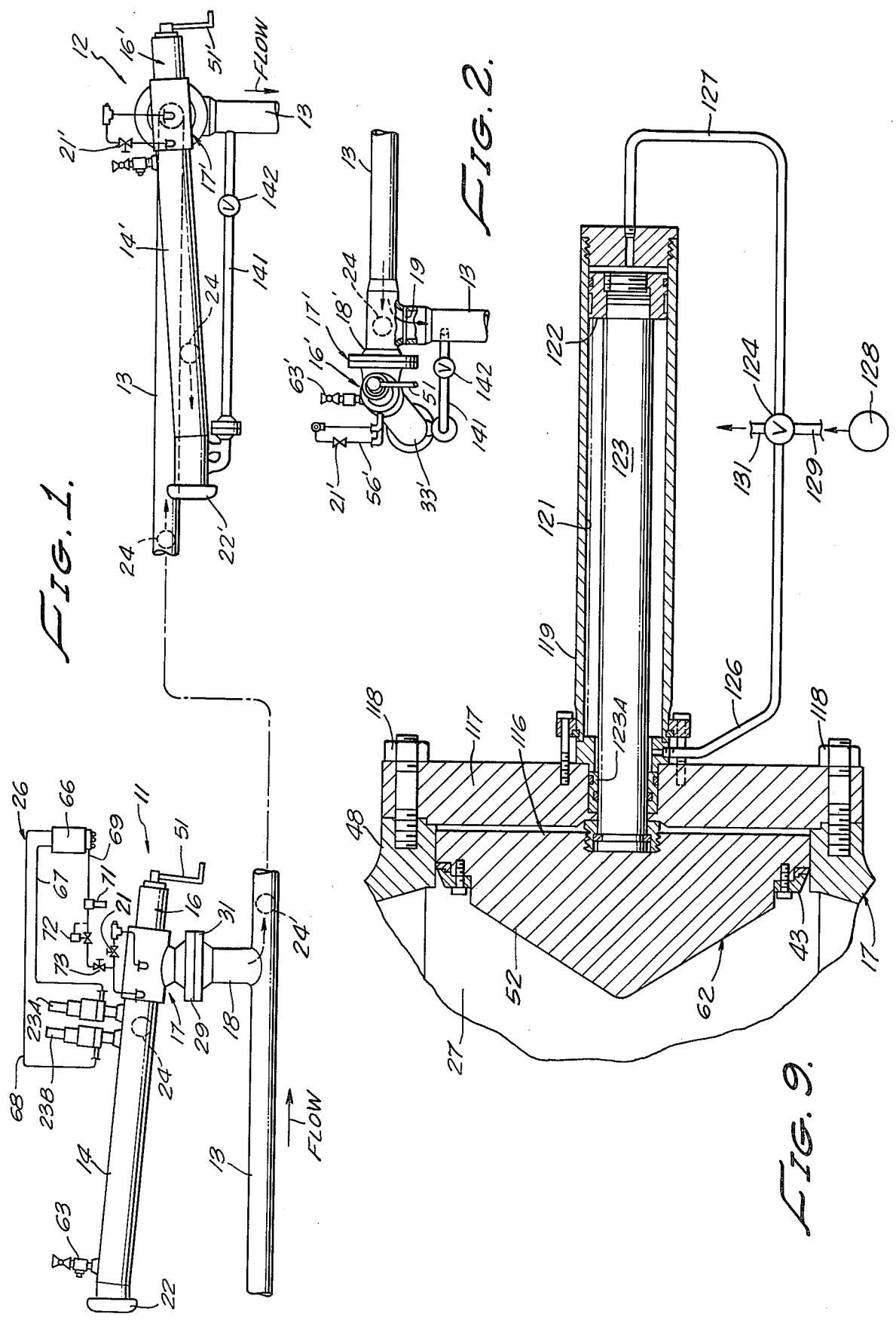

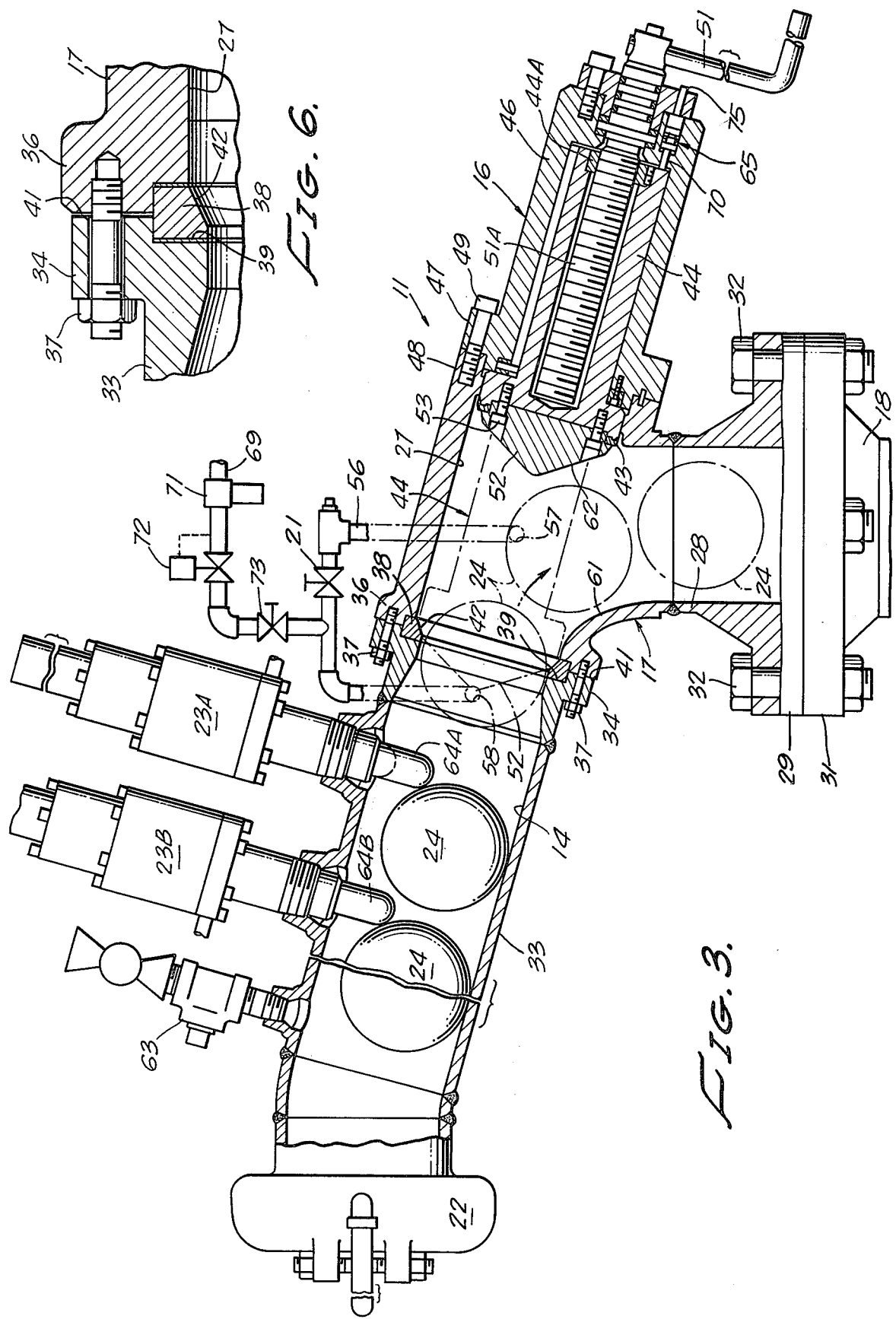

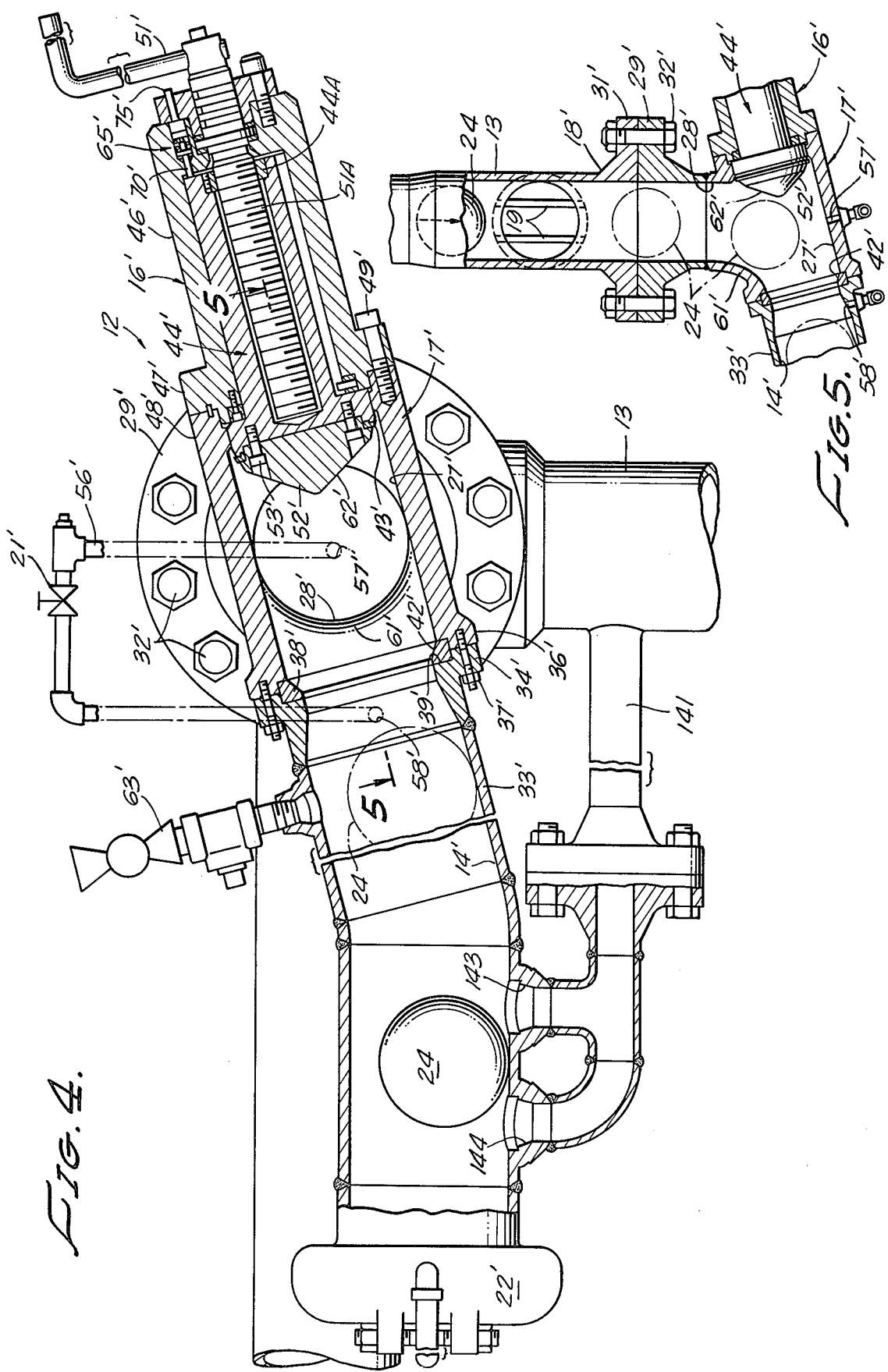

PIG BALL TRANSFER UNIT

PRIOR ART

In the prior art there are a number of pig ball launching and receiving devices having a ball storage magazine from which the balls are launched or received in a gravity movable path, and in which the magazine has a valve control connection with a fluid pipeline. It has also been known generally to utilize a pair of spaced movably mounted pins or plungers in the magazine to regulate the successive discharge of balls from the magazine in timed sequence. The closest art known to applicant are the following U.S. Pat. Nos.

2,965,125 Dec. 20, 1960
2,977,617 Apr. 4, 1961
3,166,094 Jan. 19, 1965
3,169,263 Feb. 16, 1965
3,218,660 Nov. 23, 1965

BACKGROUND OF THE INVENTION

The present invention relates to a transfer unit for launching pig balls into a pipeline and for receiving the pig balls from a downstream portion of the pipeline, the launching and receiving transfer units including many common features to facilitate their operation in the cleaning and maintenance of pipelines.

In pipelines for transporting various fluids, either gases or liquids, from one location to another, it is commonly necessary to clean various materials from the interior of the pipeline in order to maintain efficient operation. For example, pipelines carrying gases under pressure are commonly susceptible to collection of liquids produced, for example, by condensation or the like, the liquid tending to collect in relatively low portions of the pipeline. Similarly, pipelines adapted for carrying liquids such as mineral oils are susceptible to a coating of paraffin wax being deposited upon the interior of the pipeline. Such deposits tend to decrease the effective cross-sectional area of the pipeline and thereby restrict or otherwise interfere with flow through the pipeline.

Accordingly, it has become common practice to employ spheres commonly referred to as "pig balls" which are injected or launched into the pipeline and carried by fluid pressure along a portion of the pipeline to be cleaned. The pig balls are selected to have a diameter closely approximating the inside diameter of the pipeline. Accordingly, the pig balls are commonly formed from hollow rubber or elastomer shells which are filled under pressure with a fluid to establish the outside diameter of the pig ball. Thus, the outside diameter of the pig ball may be closely controlled in relation to the inside diameter of the pipeline to insure a tight fit so that, as the pig ball is propelled or moved through the pipeline, its especially formed surface cleans foreign material from the interior of the pipeline. On the other hand, the pig balls may be employed in pipelines adapted for carrying fluids such as gases to remove liquids from relatively low portions of the pipeline.

In any event, it is particularly important to facilitate launching of the pig balls into the pipeline and removal of the pig balls from a downstream portion. Obviously, cleaning operations employing passage of the pig balls through the pipeline interfere with normal transport operations by the pipeline so that efficient launching and retrieval of the pig balls are essential for economical operation of the pipeline.

At the same time, it is important to understand that pig balls of the type contemplated by the present invention may be employed for cleaning pipelines having large inside diameters of greater than six inches or one foot. Commonly, pipelines of the type contemplated by the present invention have an inside diameter in the order of 36 or 48 inches, requiring transfer units for efficiently launching pig balls of a similar size into the pipeline and for retrieving them from a downstream portion thereof.

The transfer units necessarily include valve means for selectively isolating a magazine adapted to contain the pig balls. The magazine may be employed either as a starting point from which to launch the pig balls into the pipeline or as a collecting point in which to receive the pig balls as they emerge from the pipeline. In any event, it is also important to assure proper operation of the transfer units over extended periods of time. It is also important to design the transfer units so that they may be operated and maintained while minimizing interference with normal transport operation of the pipeline.

Accordingly, there has been found to remain a need for a transfer unit capable of efficiently and reliably transferring pig balls into and out of pipelines minimizing interference with normal transport operation of the pipeline and facilitating maintenance of the transfer units themselves.

SUMMARY OF THE INVENTION

It is therefore an object of the invention to provide an efficient and reliable transfer unit for launching pig balls into pipelines and for receiving them from a downstream portion of the pipeline while overcoming or minimizing one or more problems of the type referred to above.

It is a more particular object of the invention to provide such a transfer unit for both launching the pig balls into the pipeline and for receiving them from a downstream location, the transfer units including a generally T-shaped housing having axially aligned passages and an offset passage in communication with a branch conduit of the pipeline, a magazine being in communication with one of the axially aligned passages and an axially movable valve member being arranged in the other, an annular seating means being disposed between the hollow housing and magazine in facing relation with the movable valve member.

It is also an object of the invention to provide a unit for transferring pig balls into and out of a pipeline which includes a hollow housing forming an elongated cylindrical chamber having an axially movable valve member at one end and a magazine housing connected with its other end, an annular seating member for cooperation with valve member being disposed at the juncture between the hollow housing and magazine housing to facilitate its removal and replacement.

It is yet another object of the invention to adapt a transfer unit for operation either as a launching unit or as a receiving unit in connection with a pipeline, the launching unit including means for selectively releasing pig balls from the magazine, the receiving unit being accompanied by means for directing the pig balls from a downstream portion of the pipeline toward the receiving unit, both the launching and receiving units preferably including means for selectively equalizing pressure between the magazine and hollow housing in order to facilitate operation of the valve member.

It is yet another object of the invention to provide a hollow housing within a pig ball transfer unit, interior portions of the hollow housing being formed to facilitate passage of the pig balls between the pipeline and magazine, either from the magazine to the pipeline for a launching unit or from the pipeline to the magazine for a receiving unit.

Still another object of the invention is to provide a pig ball transfer unit having a pig ball magazine with a launching and retrieving end adapted to be opened and closed by an extendible and retractable valve, said valve having a face configuration formed to guidingly direct the movement of the launched and retrieved pig balls, when the valve is retracted.

Additional objects and advantages of the invention are made apparent in the following description having reference to the accompanying drawings.

BRIEF DESCRIPTION OF THE DRAWINGS

FIG. 1 is an elevational view of a pair of pig ball transfer units constructed according to the present invention and connected with upstream and downstream portions of a pipeline to serve respectively as launching and receiving units;

FIG. 2 is an end view taken from the right side of the receiving unit of FIG. 1;

FIG. 3 is an enlarged fragmentary view in elevation, with parts in section, of the launching transfer unit of FIG. 1;

FIG. 4 is similarly an enlarged fragmentary view in elevation, with parts in section, of the receiving transfer unit of FIG. 1;

FIG. 5 is a fragmentary view, with parts in section, taken along section line 5—5 of FIG. 4;

FIG. 6 is an enlarged fragmentary view taken at the juncture between a magazine and hollow housing portion of the transfer unit, and showing the removable valve seat mounted therein;

FIG. 9 is another enlarged fragmentary view, with parts in section, of actuating means for the valve assembly in the transfer unit.

DESCRIPTION OF THE PREFERRED EMBODIMENTS

Figure 7:
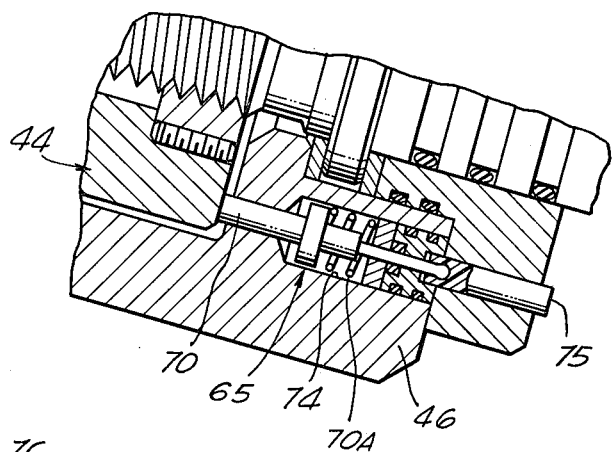
FIG. 7 is an enlarged fragmentary view, with parts in section, of a valve position indicating element associated with a valve assembly in the transfer unit.

Referring now to FIG. 1, transfer units of a type contemplated by the present invention are indicated at 11 and 12 to serve respectively as pig ball launching and receiving units in conjunction with a pipeline generally indicated at 13. The launching and receiving units include a number of features in common. Each of the units 11 and 12 includes a magazine 14, 14' for containing one or more pig balls and a valve unit 16, 16', which are supported in axial alignment with each other by a hollow housing 17, 17' which, as will be described in greater detail below, forms a T-shaped interior having a branched passage in communication with the pipeline. As will be described in greater detail below, a seating means is arranged within the housing adjacent the magazine to permit closure of the magazine from the hollow housing interior by the valve unit. The magazine and associated portions of the housing and valve assembly for both transfer units are inclined from horizontal to permit transfer of the pig balls by gravity.

Referring particularly to the left side of FIG. 1, the magazine 14 for the launching unit 11 is inclined downwardly toward the hollow housing 17 to permit gravity passage of pig balls from the magazine into the pipeline as will be made more apparent in the following description also having reference to FIG. 3. Similar components for the receiving unit 12, as shown on the right side of FIG. 1, are indicated by primed numerals corresponding to those employed in connection with the launching unit 11. For example, the magazine 14' and associated portions of the housing 17' and valve unit 16' are inclined with the magazine interior extending downwardly and away from the housing to permit gravity passage of balls from the pipeline 13 into the magazine 14'.

The hollow housing 17 for the launching unit 11 is in communication with a branch conduit 18 of the pipeline 13. The hollow housing 17' is similarly in communication with the pipeline by means of a branch conduit 18' which may be more clearly seen by combined reference to FIGS. 2 and 5. The pipeline 13 adjacent the receiving unit 12 also includes means 19 for assuring that the pig balls passing downstream from the launching unit are directed toward the receiving unit 12 and are not permitted to pass farther downstream within the pipeline. As may be best seen in FIG. 5, the means 19 is preferably embodied as a grating formed adjacent the branch conduit 18'.

Each of launching and receiving units 11 and 12 also includes equalizing valve means indicated respectively at 21 and 21' for selectively equalizing pressure within the magazine and the hollow interior of the housing. Both units also include a removable magazine cover indicated respectively at 22 and 22' for loading pig balls into the magazine of the launching unit and for removing pig balls from the magazine of the receiving unit.

Otherwise, the launching unit 11 includes additional means particularly adapting it for automatic operation to transfer or launch individual pig balls into the pipeline. For example, the launching unit 11 includes a pair of plunger assemblies 23A and 23B which are adapted to regulate passage of the individual pig balls, indicated in various positions by the numeral 24, from the magazine 14 into the hollow housing 17 for passage to the pipeline 13. The launching unit 11 also includes a timing circuit 26 for automatically regulating operation of the plunger assemblies 23A and 23B in the launching unit as described in greater detail below, having reference to FIGS. 1 and 3.

The launching unit 11 is described in greater detail below having combined reference to FIG. 1 and FIG. 3. The hollow housing 17 is formed with an axially extending cylindrical chamber 27 and a branched passage 28 communicating the cylindrical chamber 27 with the branch conduit 18. Flange connections are provided respectively at 29 and 31 on those components to permit interconnection of the housing 17 and branch conduit 18 by means of bolts 32.

The magazine 14 is formed as an elongated chamber by a magazine housing 33 equipped with an interconnecting flange 34 opposite the magazine cover 22. The flange 34 is adapted for interconnection with a flange 36 formed on the housing 17 at one end of the cylindrical chamber 27 by bolts 37.

An annular seating member 38 is arranged within an annular recess 39 formed at the juncture 41 between the hollow housing 17 and the magazine housing 33. The annular seating member 38 is formed with an annular seating surface 42 in facing relation with a seal element 43 disposed upon a valve member 44 which is axially movable within the valve unit 16. The valve unit 16 also includes a cylindrical housing element 46 formed with a flange 47 adapted for interconnection with a flange 48 formed upon the hollow housing 17 at the opposite end of the cylindrical chamber 27 from the flange 36. The flanges 47 and 48 are secured together by means of bolts such as that indicated at 49.

Within the embodiment of FIG. 3, the valve member 44 is manually movable within the cylinder 46 by means of a crank 51 connected to rotate a screw member 51A having threaded engagement with a nut 44A carried by the valve member 44. The seal element 43 is replaceably mounted upon the axially movable valve member 44 and held in place by means of a face plate 52 which is secured to the valve member 44 by means of cap screws 53. The valve member 44 may, of course, be extended through the cylindrical chamber 27 by operation of the crank 51 into the position indicated in phantom with the seal element 43 abutting the seating surface 42. The magazine chamber 14 is thus isolated from the interior of the hollow housing 17. The crank 51 may also be operated in reverse to retract the valve member 44 toward and into the solid line position illustrated in FIG. 3.

The construction of the hollow housing 17 and magazine housing 33 to form the annular recess 39 for containing the seating member 38 is particularly important within the present invention since it permits the seating member 38 and its seating surface 42 to be replaced without disconnecting the housing 17 from the branch conduit 18 of the pipeline. The construction of the magazine housing 33 and hollow housing 17 to form the annular recess 39 for containing the seating member 38 is illustrated in greater detail by the fragmentary view of FIG. 6.

The interior of the hollow housing 17 is preferably configured in a manner to facilitate passage of pig balls between the magazine 14 and the pipeline and also to minimize the possibility of damage to the surface of the balls. For this reason, the interior of the housing 17 is formed with a rounded or tapered surface 61 which interconnects the one end of the cylindrical chamber 27 adjacent the magazine 14 and the branch passage 28 extending toward the pipeline. The rounded surface 61 is arranged generally opposite the valve member 44, at least when it is in its retracted position as illustrated in FIG. 3. The face plate 52 is also formed with a tapered surface indicated at 62 to cooperate with the rounded or tapered surface 61 in order to facilitate passage of the pig balls between the pipeline and the magazine.

Referring again to FIG. 3, the equalizing valve 21 is mounted in a conduit 56 which is in communication at one end 57 with the hollow interior of the housing 17 and at its other end 58 with the magazine chamber 14. Thus, when the valve member 44 is seated against the surface 42, the valve 21 may be opened to equalize pressure in the magazine chamber 14 with the pressure in the interior of the housing 17 and the pipeline 13 (see FIG. 1).

A blow-off valve 63 is arranged in communication with the upwardly inclined end of the magazine chamber 14 in order to vent gases from the chamber.

The elements described above also appear in the receiving unit 12 and are accordingly indicated with similar primed numerals in the enlarged view of FIG. 4.

As noted above, the launching unit 11 includes additional components which particularly adapt the launching unit for regulating passage of the pig balls 24 into the pipeline. For example, the plunger assemblies 23A and 23B are arranged along the magazine with a spacing somewhat greater than the diameter of one of the pig balls 24. Each of the plunger assemblies includes a movable plunger, indicated respectively at 64A and 64B extending downwardly into the magazine chamber 14. Construction of the plunger assemblies is described below, having reference to the detailed view of FIG. 8. However, in operation, the plungers are normally extended downwardly into the magazine chamber to prevent passage of the pig balls as is indicated by the solid line representation in FIG. 3. The plungers may also be retracted, into a position indicated in phantom for the plunger 64A to selectively permit passage of the pig balls. Having reference to FIG. 1, the plunger assemblies 23A and 23B are operated by the timing circuit 26 in order to selectively regulate passage of the balls 24.

The timing circuit 26 includes a timer unit 66 which is in communication with the plunger assemblies 23A and 23B by means of conduits 67 and 68 respectively. The timer unit 66 is also in communication with another conduit 69 containing a filter unit 71, a pressure regulating unit 72 for limiting maximum pressure in the timer 66, and a regulating valve 73. The conduit 69 is in communication with the interior of the magazine chamber by interconnection with the conduit 56 intermediate the valve 21 and the conduit end 58. The timer unit 66 itself is of a conventional design and operable for communicating fluid under pressure to the respective plunger assemblies 23A and 23B in timed relation depending upon the preferred operating sequence as subsequently described in greater detail.

The launching unit 11 also includes, in common with the receiving unit 12, a valve position indicator assembly 65 (see FIGS. 3 and 7) having a plunger 70 and loading spring 70A arranged in a chamber 74 at the outer end of the valve cylinder 46, the plunger extending inwardly for engagement by the valve member 44 in its fully retracted position as illustrated in FIG. 3. The plunger 70 is coupled with an indicating pin 75 which is caused to project at the outer end of the valve cylinder 46 when the valve member 44 is in its retracted position. Thus, the pin 75 provides an indication to the operator that the valve member 44 is fully retracted to permit passage of pig balls between the pipeline and the magazine. When the valve member 44 is extended toward the seating surface 42, the plunger 70 and indicating pin 75 are retracted under the spring force acting on the plunger.

Figure 8:
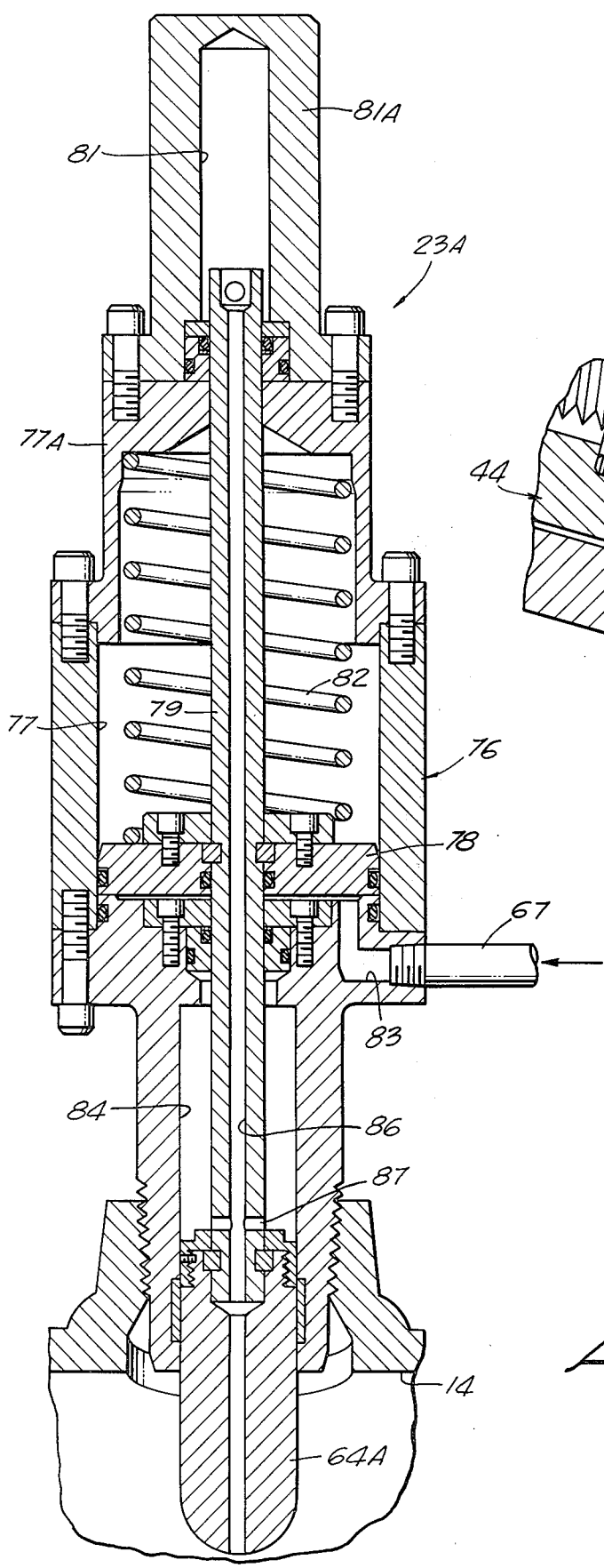
FIG. 8 is a fragmentary view, with parts in section, taken along the longitudinal axis of one of a pair of pig ball controlling plunger assemblies in the launching unit of FIG. 3.

The internal construction of one of the plunger assemblies, for example that indicated at 23A, is best illustrated by the fragmentary sectioned view in FIG. 8. As shown therein, the plunger assembly includes an elongated fabricated housing 76 forming a main cylinder chamber 77 containing a reciprocating piston 78 coupled with a rod 79 which extends in opposite directions from the piston and is secured at one end to the plunger 64A while its other end extends into a cylindrical chamber 81 of an end cap 81A. A spring 82 is arranged within the cylinder 77 and a connected cylinder end cap 77A for interaction with one side of the piston 78 to urge the piston and rod 79 downwardly so that the plunger 64a is normally urged into an extended position in the magazine chamber 14 (see FIG. 3).

A passage 83 is formed in the housing 76 for communicating a signal from the fluid supply conduit 67 (see FIG. 1) with one end of the chamber 77 on the other side of the piston from the spring 82. An additional cylindrical chamber 84 is formed at the other end of the housing 76 to receive and support the plunger 64A. The combined effective cross-sectional area of the rod 79 in the chamber 81 and the effective annular cross-sectional area of the end of the plunger 64A in the chamber 84 is equal to the entire effective cross-sectional area of the plunger 64A in the magazine 14. In addition, both the plunger 64A and rod 79 are penetrated along their entire length by a passage 86 which extends from the magazine chamber 14 to the cylindrical chamber 81. A cross-drilled passage 87 communicates the axial passage 86 with the annular chamber 84. Accordingly, pressure in the magazine chamber 14 is also present in the two chambers 81 and 84 so that equal pressures act in opposite direction upon the combination of the plunger 64A and rod 79. The position of the plunger 64A is therefore controlled only by the opposing forces of the spring 82 and fluid pressure from the conduit 67 acting upon the piston 78. Normally, as noted above, the plunger 64A is biased to its extended position as illustrated in FIG. 3 under the influence of the spring 82. However, when a pressure signal is transmitted from the timer 66 through the conduit 67, it shifts the piston 78 upwardly against the spring 82 to retract the plunger 64A.

The other plunger assembly 23B is of similar construction except that it is in communication with the other signal supply conduit 68 (see FIG. 1). Thus, the timer 66 functions to selectively and individually control operation of the two plungers 64A and 64B. The pressure balanced construction of the two plunger assemblies is of particular importance to assure proper response of the plunger to a pressure signal from the timer.

Before proceeding with a description of the manner of operation for the launching and receiving units 11 and 12 in conjunction with the pipeline 13, an alternate embodiment of the valve unit 16 will be described for the launching unit 11 of FIG. 3, as illustrated in FIG. 9. As shown therein, the flange 48 at the right end of the cylindrical chamber 27 in the hollow housing 17 is operatively connected with a modified valve unit 116 which includes a similar seal element 43 and tapered face plate 52 arranged within the cylindrical chamber 27 for interaction with the annular seating surface 42 (see FIG. 3).

Otherwise, the modified valve unit 116 includes a flanged mounting plate 117 secured to the flange 48 by bolts 118. A housing 119 is secured to the plate 117 and forms an elongated cylinder 121 containing a reciprocable piston 122 coupled with one end of a rod 123, which is reciprocable in a stuffing box 123A supported on the plate 117, and has its other end connected with the face place 52 which corresponds to the structure previously described and shown in FIG. 3. Opposite ends of the cylinder 121 are in communication with a multi-position control valve 124 by means of respective conduits 126 and 127. The valve 124 is also in communication with a source 128 of fluid under pressure, through a conduit 129, as well as an exhaust conduit 131. In operation, the valve 124 may be selectively positioned to direct actuating fluid from the source 128 through one or the other of the conduits 126 and 127 to the respective ends of the cylinder 121 in order to retract or extend the rod 123 and the connected valve face plate 52. The end of the cylinder, which is not connected to the pressure source, is at the same time placed in communication with the exhaust conduit 131. The valve 124 may also be positioned to close both of the conduits 126 and 127 in order to hydraulically lock the position of the piston 122, the rod 23 and the face plate 52. Accordingly, in the following description of the operation for either the launching or receiving units 11 and 12, it will be apparent that the manually operated valve 16 or 16' could be replaced by a hydraulically-actuated valve such as that illustrated in FIG. 9.

Before proceeding with the description of the operation, it should be noted that the receiving transfer unit 12 illustrated in FIG. 4 includes one feature that is not present in the launching unit 11 of FIG. 3. Initially, it will be seen that the magazine chamber 14' and the cylindrical chamber 27' of the housing 17' are inclined so that the magazine chamber extends downwardly and away from the point at which the cylindrical chamber 27' is connected with the branched passage 28'. Thus, as the pig balls approach the downstream receiving unit 12 and enter the cylindrical chamber 27', they move under the influence of gravity into the magazine 14'.

With the receiving unit 12 being adapted for use with a pipeline transmitting gases, an additional vent conduit 141 is provided for connecting the lower end of the magazine 14' with the pipeline 13. A vent valve 142 is arranged within the conduit 141, as shown in FIG. 1, in order to selectively regulate communication between the lower end of the magazine 14' and the pipeline 13. The vent conduit 141 includes spaced apart branched inlet ports 143 and 144 in communication with the lower end of the magazine chamber to prevent blockage by one of the pig balls 24. In operation, the valve 142 may be selectively operated in order to drain any accumulated liquid out of the magazine, when desired.

In operation, a number of pig balls may be loaded into the magazine 14 of the launching unit 11 in the following manner, having reference to FIGS. 1 and 3. Initially, the valve member 44 of the assembly 16 is extended into the phantom position illustrated in FIG. 3 to isolate the magazine 14 with respect to the interior of the housing 17 and the pipeline. The valve 21 is then closed to further isolate the magazine from the housing interior and the valve 73 is closed to block the timing unit 66. The blow-off valve 63 is then momentarily opened to relieve residual pressure within the magazine 14. The cover 22 may now be opened to permit access to the magazine and loading of the pig balls 24. If desired, the plunger assembly 23B may be operated to retract its plunger 64B in order to permit one of the pig balls to be initially positioned between the plunger 64A and 64B during loading.

After the magazine is loaded, the cover 22 is replaced and the valve 21 opened in order to again equalize pressure in the magazine 14 with the interior of the housing 17 and the pipeline 13. The valve 73 is also opened to provide actuating pressure to the timing unit 66 for communication to the plunger assemblies 23A and 23B in a manner described below. The valve member 44 of the assembly 16 is then retracted into the solid line position illustrated in FIG. 3 with the indicator assembly 65 providing a visual indication to the operator that the valve member is fully retracted.

Operation of the timing unit 66 may be based, for example, upon the time at which it receives an initial pressure signal from the magazine 14. Thereafter, the timer 66 functions to initially operate the plunger assembly 23A, causing it to retract its plunger 64A and permit one of the pig balls 24 to pass through the hollow housing and into the pipeline for passage therealong toward the receiving unit 12.

Referring to FIG. 3, it may be seen that the housing 17 is constructed to establish the angle of inclination for the magazine 14 and also to form, in cooperation with the tapered surface 62 of the face plate 52, a smooth curved guide path through the housing itself for assuring passage of the pig balls under the influence of gravity from the magazine into the pipeline. Once the pig ball is in the pipeline, it is carried downstream by flow pressure within the pipeline.

After the first pig ball has passed into the pipeline, the actuating signal to the plunger assembly 23A is terminated, causing its plunger 64A to again be extended into the solid line position illustrated in FIG. 3. The second plunger assembly 23B is then actuated, causing its plunger 23B to retract and permit another pig ball from the magazine to move into the ready position between the two plungers 64A and 64B. Thereafter, the actuating signal to the second plunger assembly 23B is terminated, permitting its plunger to again extend into the position illustrated in FIG. 3. With the loading assembly 11 in this condition, the timer 66 determines the interval after which another pig ball is introduced into the pipeline. At that time, an actuating signal is again communicated to the first plunger assembly 23A and the procedure described above is repeated any number of times. When the magazine 14 is empty of pig balls, the start-up procedure may again be repeated in order to load additional pig balls into the magazine.

As each of the pig balls passes downstream through the pipeline 13, it is prevented from passing the receiving unit 12 by the grating 19 in the pipeline. Accordingly, having reference particularly to FIGS. 4 and 5, flow pressure in the pipeline causes the pig ball to move through the branched passage 28' of the housing 17' being guided by the rounded surface 61' and the tapered surface 62' of the face plate 52'. The housing 17' is also configured to establish the angle of inclination for both the cylindrical passage 27' and the magazine 14'. Accordingly, as a pig ball enters the cylindrical passage 27', it moves downwardly into the magazine 14' under the influence of gravity.

When the magazine 14' of the receiving unit 12 is full, it may be unloaded in the following manner. Initially, the valve member 44' of the assembly 16' is extended into closing relation against the seating surface 42' to isolate the magazine 14' from the housing. The valve 21' is then closed and the blow-off valve 63' is momentarily opened to relieve residual pressure within the magazine 14'. The cover 22' may then be opened to remove the pig balls from the magazine. After the pig balls are removed and the cover 22' is closed, the valve 21' is reopened to equalize pressure between the magazine and the pipeline, the valve member 44' then being shifted rightwardly as viewed in FIG. 4 into its fully retracted position as indicated by the indicator assembly 65'. The receiving unit 12 is then in condition to accept additional pig balls moving downstream in the pipeline from the launching unit 11.

It is also noted that, as necessary, the valve 142 (see FIG. 1) is opened in order to vent liquid standing in the magazine 14' back into the pipeline 13. This step may be accomplished, for example, prior to the procedure described above for unloading the magazine 14'.

Numerous variations and modifications of the herein described apparatus are believed apparent. For example, the valve assembly 16 of FIG. 1 may be operated by either the manual crank 51 illustrated in FIG. 3 or the hydraulic unit illustrated in FIG. 9. Additional modifications and variations are also believed apparent within the scope of the present invention which is accordingly defined only by the following appended claims.

What is claimed is:

1. A transfer unit for use in combination with a pipeline to transfer pig balls into and out of the pipeline through a branch conduit thereof, comprising:
   a substantially T-shaped hollow housing including an axially extending passage and an offset passage in communication with each other;
   means forming an elongated magazine in axial alignment with and at one end of said axially extending housing passage, said offset passage having a straight axis forming an oblique angle relative to said axially aligned passage and said elongated magazine, said angle being obtuse as measured between said magazine and said offset passage whereby said unit may be connected to a pipeline with said offset passage perpendicular thereto and with said magazine sloping downwardly toward said offset passage or downwardly away from said offset passage to serve selectively as a ball launching means or a ball receiving means;
   means for supporting an axially movable valve member at the other end of and axially aligned with said housing passage;
   annular seating means disposed between said hollow housing and said magazine in facing relation with said axially movable valve member;
   said T-shaped hollow housing also including means for connecting its offset passage with the branch conduit of the pipeline;
   actuating means operatively coupled with said valve member for extending it into engagement with said annular seating means to isolate said magazine from the pipeline and for retracting said valve member to permit communication between said magazine and the pipeline; and
   at least one hydraulically actuated plunger extending into said magazine into a discharge path of movement of pig balls from the magazine, and being retractable to release the balls for discharge from the magazine, and means for applying fluid pressure from said magazine to said plunger in a direction to oppose and equalize the force exerted on the plunger by any fluid pressure in the magazine tending to move the plunger in its retractable direction.

2. A transfer unit according to claim 1, in which the actuating means is manually operable and comprises:
   a manually rotatable screw supported against axial movement;
   a nut carried by said valve member and being threadedly axially movable on said screw; and
   a crank for manually turning said screw.

3. A transfer unit according to claim 1, which includes means in the path of movement of said valve member operable in response to engagement and disengagement by said valve member to visually indicate its retracted and extended positions.

4. In a transfer unit for use with a pipeline to transfer pig balls into and out of the pipeline, including
   a hollow housing having an elongated cylindrical chamber, a valve member movably mounted at one end of the cylindrical chamber for extendible and retractable movement therethrough, the hollow housing including branch means for transferring pig balls between the pipeline and the cylindrical chamber, a housing forming a magazine for containing one or more pig balls, the magazine being in communication with the other end of the cylindrical chamber, the improvement comprising:

the magazine housing being a unitary structure separable from the hollow housing and having a juncture with the hollow housing at the other end of the cylindrical chamber;

the magazine housing and the hollow housing internally forming an annular recess at said juncture;

an annular seating member disposed in said annular recess and presenting an annular seating surface in facing relation with the valve member; and means at said juncture for releasably securing the magazine housing to the hollow housing in order to facilitate replacement of said annular seating member.

5. A transfer unit according to claim 4, wherein said hollow housing forms a guide surface generally opposite the valve member and intermediate the other end of the cylindrical chamber and its branch means for forming a guide path for pig balls passing between the pipeline and the magazine.

6. A transfer unit according to claim 5, wherein an inner end portion of the elongated valve member facing said annular seating surface is tapered in order to act in combination with said guide surface for facilitating transfer of the pig balls.

7. A transfer unit according to claim 5, wherein the hollow housing is formed for connection with the magazine housing and the pipeline in a manner establishing a gravity flow path through its cylindrical chamber and between the pipeline and the magazine.

8. A transfer unit according to claim 4, wherein the hollow housing is formed for connection with the magazine housing and the pipeline in a manner establishing a gravity flow path for the pig balls through said cylindrical chamber and between the pipeline and the magazine.

9. A transfer unit for use in combination with a pipeline to transfer pig balls into and out of the pipeline through a branch conduit thereof, comprising:

a substantially T-shaped hollow housing including an axially extending passage and an offset passage in communication with each other;

means forming an elongated magazine in axial alignment at one end of said axially extending housing passage, said magazine and axially extending passage being inclined from horizontal to permit gravity transfer of the pig balls between the pipeline and magazine;

means for supporting an axially movable valve member at the other end of the axially aligned housing passage;

annular seating means disposed between said hollow housing and said magazine in facing relation with said axially movable valve member;

said T-shaped hollow housing also including means for connecting its offset passage with the branch conduit of the pipeline;

actuating means operatively coupled with said valve member for extending it into engagement with said annular seating means to isolate said magazine from the pipeline for retracting said valve member to permit communication between said magazine and the pipeline;

said magazine being forming by a cylindrical member detachable from said hollow housing, and said cylindrical magazine and said hollow housing forming at their juncture an annular recess for receiving said annular seating means to facilitate removal and replacement of said annular seating means.

10. The invention as set forth in claim 9, which includes at least one hydraulically actuated plunger extending into said magazine into a discharge path of movement of pig balls from the magazine, and bein g retractable to release the balls for discharge from the magazine, and means for applying fluid pressure from said magazine to said plunger in a direction to oppose and equalize the force exerted on the plunger by the fluid pressure in the magazine tending to move the plunger in its retractable direction.

* * * * *